J. C. SUNDBY.
STORAGE BATTERY ELEMENT.
APPLICATION FILED SEPT. 7, 1920.
1,417,214.
Patented May 23, 1922.
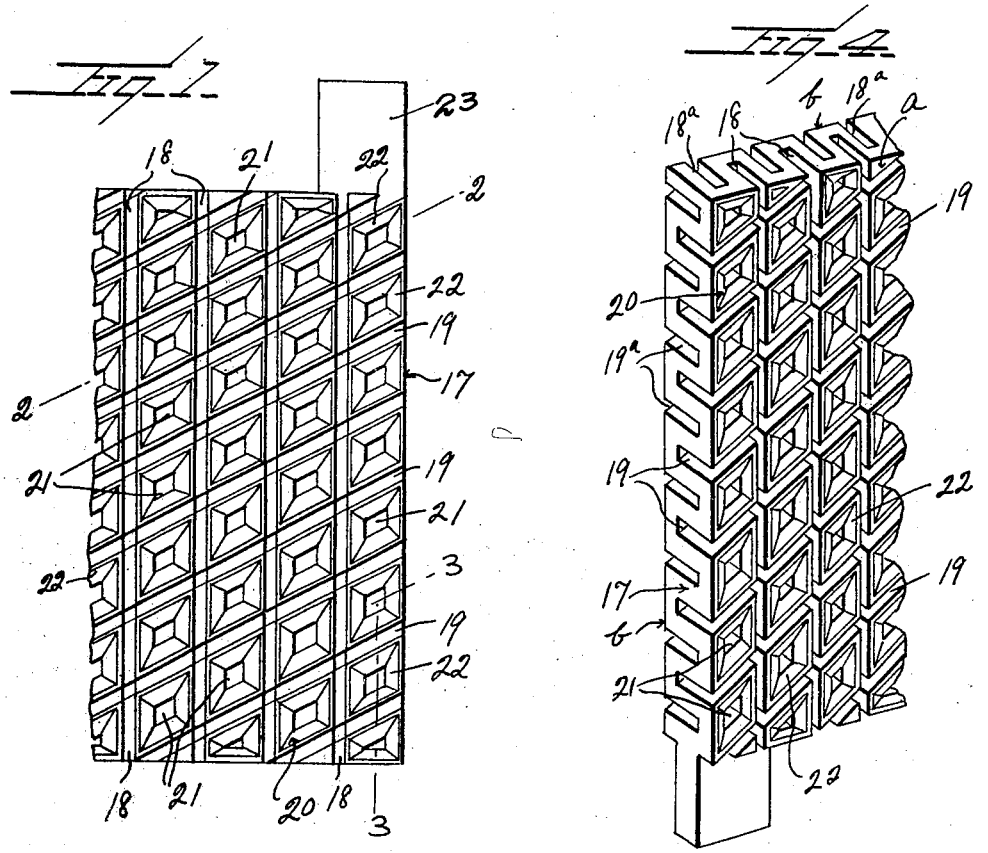
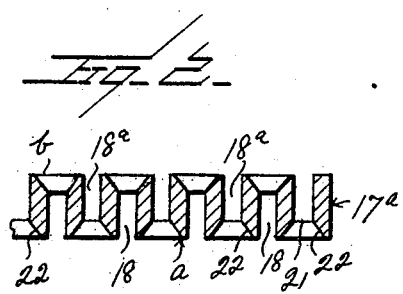
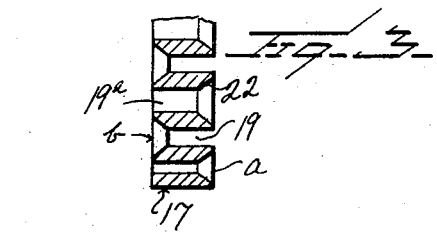
INVENTOR.
J.C. Sundby
BY
Watson E. Coleman
ATTORNEY.

UNITED STATES PATENT OFFICE.

JOHN CLARENCE SUNDBY, OF ENDERLIN, NORTH DAKOTA, ASSIGNOR TO SUNDBY BATTERY & MANUFACTURING COMPANY, OF ENDERLIN, NORTH DAKOTA, A CORPORATION OF NORTH DAKOTA.

STORAGE-BATTERY ELEMENT.

1,417,214.  Specification of Letters Patent.  Patented May 23, 1922.

Application filed September 7, 1920. Serial No. 408,708.

*To all whom it may concern:*

Be it known that I, JOHN CLARENCE SUNDBY, a citizen of the United States, residing at Enderlin, in the county of Ransom and State of North Dakota, have invented certain new and useful Improvements in Storage-Battery Elements, of which the following is a specification, reference being had to the accompanying drawings.

This invention relates to storage batteries, and particularly to the construction of the battery plates or battery elements for a Planté battery.

The general object of this invention is to so form the battery plate that it will not unduly buckle and to minimize this buckling as much as possible and thus prevent damage being done to the separators between the two, and in this connection to provide a battery plate or element so constructed that slight buckling may occur at a large number of points and thus prevent a large buckling of the plate as a whole.

A further object is to so form the battery element that all gas bubbles which may form on every overhanging surface of the element will find their way to channels whereby they may rise to the top of the element.

And another object is to so construct this form of element that the electrolyte may have free circulation, and to so form the passages through which the electrolyte circulates that there will be no surface whose plane is horizontal for the gas bubbles to collect on.

Another object is to provide a battery element having a maximum of active surface—that is surface in contact with electrolyte—in proportion to its height, width and thickness.

Other objects will appear in the course of the following description.

My invention is illustrated in the accompanying drawings, wherein:—

Figure 1 is a face view of a storage battery element constructed in accordance with my invention;

Figure 2 is a section on the line 2—2 of Figure 1;

Figure 3 is a fragmentary section on the line 3—3 of Figure 1;

Figure 4 is a fragmentary perspective view with the element inverted to show the lower end thereof.

The battery element or plate which is illustrated in the drawings is designed to be used in a Planté storage battery where there is no lead oxide or other active material pasted upon the plates or elements. The plate illustrated is cast or otherwise formed of antimonial lead or any other suitable composition of this character. This plate or element, which I have designated 17 as a whole, is formed to provide a series of vertical grooves 18 extending downward the entire length of the plate disposed at equal spaced distances and extending inward from one face of the plate. The opposite face of the plate is formed with like grooves 18$^a$ which also extend vertically and extend inward from the face of the plate but which are alternately disposed with reference to the grooves 18. Intersecting the grooves 18 and extending inward from the face $a$ of the plate is a series of transverse grooves 19 which are disposed the same distance apart as the grooves 18, but which do not intersect the grooves 18 at a right angle thereto but at an inclination to the horizontal, as illustrated most clearly in Figure 1. On the face $b$ of the plate there is a like series of grooves 19$^a$ which also extend at an inclination to the horizontal and intersect the grooves 18$^a$ and which are disposed alternately or in staggered relation to the grooves 19. It will be noted from Figure 4 that several of the uppermost grooves or channels 19 and 19$^a$ intersect the upper edge of the plate at the intersection of the grooves 18 or 18$^a$ with the upper face of the plate, and the same is true of several of the lower groves 19 and 19$^a$.

The intersecting grooves divide each face of the plate into a series of polygonal portions 20, and these polygonal portions 20 have extending through them the apertures 21, these apertures 21 on the face $a$ of the plate opening into the grooves 18$^a$ and 19$^a$, and those apertures leading from the face $b$ of the plate opening into the grooves 18 and 19 respectively. Each aperture 21 at the end which opens upon an outer face of the plate is countersunk, as at 22. This countersink extends through the entire depth of the metal in each individual parallelogram 20. Thus each aperture 21 is flared at its end adjacent a face of the plate and the object of flaring this aperture is to allow the electrolyte to circulate easily through the plate and come in contact with opposite faces of the plate, and the object of countersinking or flaring the extremities of the apertures 21 is to prevent any horizontal surface being formed upon which gas bubbles may collect. It is to be particularly noted that it is for a like reason that the grooves 19 are inclined to the horizontal or extend upward and toward one edge of the plate instead of extending at right angles to the grooves 18. Thus all gas bubbles formed on the under surfaces of the upper walls of the slots or grooves will move upward and find their way into the vertical slots 18 and so escape from the plate. It will thus be seen that in this improved plate there is no surface whose plane is horizontal and upon which the gas bubbles may collect.

By forming the electrolyte receiving grooves 18 and 18ª and 19 and 19ª in the plate, the plate is divided into a series of polygonal unit portions 20 which comes in contact with electrolyte and which are connected by connecting webs to adjacent unit portions so that the unit portions may become warped or deformed without warping or deforming the plate as a whole. In other words, the warping or deformation of the plate is localized. The plate is, of course, to be provided with the usual post 23 whereby the plates are to be connected up with the terminals of the battery.

A battery plate or element constructed in accordance with this invention will not buckle as a whole, as a practically solid plate will do, but will buckle locally so that no strain will be exerted on the separator between the battery plates which would tend to break the separator and thus set up a short circuit, but separate parts of the element will separately buckle under non-uniform heating. Thus the plate or element will buckle slightly at a plurality of points instead of there being a deformation of the entire plate and the general plane of the element will be but slightly changed by local deformation. The action of buckling will tend to bring portions of the element on each side of the intersecting grooves nearer to or further from each other, but the element as a whole will not get out of shape.

While I have illustrated a detailed form of this plate or element, and while preferably the element will have the form shown in detail in Figure 4, yet it is obvious that it might be modified in many ways without departing from the spirit of the invention.

I claim:—

1. A battery element comprising a metallic plate having its opposite faces intersected by two series of grooves, the grooves of one series being disposed in angular relation to the grooves of the other series, the grooves thus dividing the active faces of the battery element into a series of electrically connected polygonal electrolyte contacting portions, each of these polygonal portions being pierced transversely of the thickness of the plate to permit the passage of electrolyte through the plate.

2. A battery element comprising a metallic plate having one face traversed by longitudinal and transversely extending, intersecting grooves, the transverse series of grooves being disposed at less than a right angle to the longitudinal grooves whereby said transverse grooves will be disposed at an inclination to a horizontal plane when the element is in use, said grooves defining a series of polygonal portions, each one of these polygonal portions being apertured through the thickness of the plate, said apertures tapering from one face of the plate to the other.

3. A battery element comprising a metallic plate having its opposite faces traversed by intersecting grooves, the grooves extending inward from one face of the plate being alternately arranged with the correspondingly directed grooves on the other face of the plate.

4. A battery element comprising a metallic plate having a series of vertical grooves extending inward toward each other, the grooves on one face being disposed alternately with relation to the groves on the opposite face, said plate being also formed with a series of transversely extending grooves intersecting the first named grooves and extending inward from the faces of the plate, the transverse grooves extending inward from one face of the plate being alternately disposed with relation to the transverse grooves extending inward from the other face of the plate, said transverse grooves being disposed at an inclination to the horizontal.

5. A battery element comprising a metallic plate having on its opposite faces a series of approximately longitudinal grooves extending inward from each face, the longitudinal grooves on one face being disposed alternately with relation to the correspondingly directed grooves on the opposite face, said plate being also formed on its opposite faces with a series of transversely extending grooves intersecting the first named grooves, said transverse grooves and the longitudinal grooves defining many-sided portions on each side of the plate, these many-sided portions having apertures extending axially through them and intersecting the grooves on the opposite face of the plate.

6. A battery element comprising a metallic plate having on its opposite faces a series of longitudinal grooves extending inward toward each other, the grooves on one face being disposed alternately with relation to the grooves on the opposite faces and formed on its opposite faces with a series of transversely extending grooves intersecting the first named grooves and extending inward from the faces of the plate, said transverse grooves and the longitudinal grooves defining many sided portions on each face of the plate, these many sided portions having uniformly tapering apertures extending axially through them and intersecting the grooves on the opposite face of the plate, said apertures being formed to flare toward the outer ends of the apertures.

In testimony whereof I hereunto affix my signature.

JOHN CLARENCE SUNDBY.